United States Patent [19]

Fujita et al.

[11] 4,365,999
[45] Dec. 28, 1982

[54] CORROSION-INHIBITING METHOD FOR STEEL MATERIALS IN CONCRETE

[75] Inventors: Toshio Fujita, Toyonaka; Toru Kashima, Nishinomiya, both of Japan

[73] Assignees: Kiresuto Kagaku Kabushiki Kaisha; Osaka Semento Kabushiki Kaisha, both of Osaka, Japan

[21] Appl. No.: 214,004

[22] PCT Filed: Mar. 2, 1979

[86] PCT No.: PCT/JP79/00053
§ 371 Date: Nov. 2, 1980
§ 102(e) Date: Sep. 10, 1980

[87] PCT Pub. No.: WO80/01802
PCT Pub. Date: Sep. 4, 1980

[51] Int. Cl.$^3$ ............................................. C04B 7/35
[52] U.S. Cl. .................................... 106/90; 106/97; 106/314; 428/378; 428/457; 428/470
[58] Field of Search ............... 106/14.15, 14.21, 14.42, 106/14.44, 90, 97, 314

[56] References Cited

U.S. PATENT DOCUMENTS 3,668,150  6/1972  Horvitz ............................... 106/314
4,012,195  3/1977  Noack ................................ 106/14.15

FOREIGN PATENT DOCUMENTS 443008  4/1975  U.S.S.R. ............................... 106/90

*Primary Examiner*—James Poer
*Attorney, Agent, or Firm*—Stevens, Davis, Miller & Mosher

[57] ABSTRACT

A corrosion-inhibiting method for protecting steel materials in concrete or mortar, characterized in that a nitrite, a compound of general formula NH(R)CH$_2$COOH (wherein R represents a H atom or an alkyl group having 1 to 4 carbon atoms) or salts thereof, and a hydrazine hydrate are incorporated into the concrete or mortar is provided. The corrosion-inhibiting method is particularly available for construction of steel reinforced concrete structures in which chloride-containing sea sand is used as aggregates and does not affect a property of the concrete or mortar.

18 Claims, No Drawings

CORROSION-INHIBITING METHOD FOR STEEL MATERIALS IN CONCRETE

TECHNICAL FIELD

The present invention relates to a corrosion-inhibiting method for steel materials in concrete or mortar and especially relates to a corrosion-inhibiting method for steel materials in concrete or mortar characterized in that the corrosion inhibitor comprises a nitrite, a glycine or glycine derivatives and a hydrazine hydrate.

BACKGROUND ART

Regulations concerning the gathering of aggregate materials for use in concrete have been made more rigorous year after year to protect disasters, natural environments and the like. For this reason, there has been a rapid switch to sea sands for use as fine aggregates in place of mountain sands and river sands. Each year the amount of sea sands used increases.

In reinforced concrete structures and the like wherein sea sands are used, there is a problem that the steel materials used in concrete, such as reinforcing bars, steel frames, lathes and the like, are rusted and corroded by the chlorides contained in sea sands. There is generally about 0.1 to 0.4% salinity in sea sands which have not been desalted. Thus it is very dangerous to use such sea sands without any treatment, because the possibility of said problem will occur is exceedingly high. Therefore, it is necessary to regulate the maximum amount of chlorides contained in sea sands to be used in reinforced concrete structures and the like. According to the 1975 Revised Edition of JASS (Japanese Architectural Standard Specification), the maximum amount of chlorides is 0.1 percent by weight calculated in terms of sodium chloride based on an absolute dry amount.

To prevent the aforesaid problem caused by chlorides contained in sea sands, there are two methods; a flushing method and a method using a corrosion inhibitor. There is a greater tendency to employ the latter method because the former method requires a large amount of clear water and is not easily carried out.

The use of nitrites, dichromates or mixtures thereof (Japanese Patent Publication No. 8021/1969), the use of a mixture of sodium nitrite and calcium nitrite (Japanese Patent Publication No. 20260/1978) and the like are already known as corrosion-inhibiting methods. However, these methods only teach a corrosion-inhibiting effect for sodium chloride and calcium chloride and do not explain a corrosion-inhibiting effect for the wide variety of salts present in sea water. Generally nitrites do not have a sufficient corrosion-inhibiting effect unless a relatively large amount of nitrites relative to the chlorides is used. Dichromates being harmful to the human body are not preferable from the viewpoint of avoiding environmental pollution.

The present invention has been developed in order to solve the aforesaid problem. The gist of the invention is the use of corrosion inhibitor which not only has an excellent corrosion-inhibiting effect for steel materials but also has no bad side effects upon such properties of concrete or mortar as coagulation, hardening, size stability, durability and the like.

DISCLOSURE OF THE INVENTION

The present invention provides a corrosion-inhibiting method for steel materials in concrete or mortar, characterized in that
(1) a nitrite,
(2) a compound of general formula:

$$NH(R)CH_2COOH \qquad [1]$$

(wherein R represents a H atom or an alkyl group having 1 to 4 carbon atoms) or salts thereof, and
(3) a hydrazine hydrate
are incorporated in the chlorides containing concrete or mortar.

The term "steel materials" as used in describing the present invention means reinforcing bars, steel frames and all other steel materials such as lathes used for such purposes as the prevention of a contraction and a cracking of concrete or mortar and other purposes.

The nitrites used in the present invention are alkali metal salts or alkaline earth metal salts of nitrous acid or mixtures thereof; sodium nitrite is especially preferable.

The salts of a compound represented by the aforementioned general formula [1] are alkali metal salts or alkaline earth metal salts of said compound or mixtures thereof; sodium salt of glycine is especially preferable.

The amounts to be used and the relative proportion of each component in the corrosion inhibitor of the present invention depend upon the amount of chlorides incorporated in the concrete or mortar and are therefore not critical. In general, 0.5–0.05 part by weight of component (1) as sodium nitrite, 0.5–0.005 part by weight of component (2) as glycine and 0.5–0.002 part by weight of component (3) as 100% hydrazine hydrate are blended based on 1 part by weight of the chlorides as sodium chloride in order that the corrosion inhibitor may display a sufficient corrosion-inhibiting effect when ordinary sea sands are used as the fine aggregate.

Methods for incorporating the corrosion inhibitor of the present invention into the concrete or mortar are as follows. Although each component of the corrosion inhibitor may be directly added to concrete or mortar during blending or individually at kneading time, it is preferable to dissolve the components in the water used for kneading. Alternatively, the steel materials to be protected may be immersed in an aqueous solution of the corrosion inhibitor, or an aqueous solution of the corrosion inhibitor may be sprayed or coated on the surfaces of the steel materials. An appropriate method for incorporating the corrosion inhibitor may be selected by taking the amount of chlorides, a workability, a scale of constructions and the like into consideration.

In general, although that the corrosion-inhibiting effect of a corrosion inhibitor for steel materials in concrete or mortar must be excellent, the corrosion inhibitor must also not harmfully effect such properties as solidification, hardening, size-stability, durability and the like of concrete or mortar. Further, the inhibitor must not contain a component harmful to the human body and must be convenient and economical to use and so forth. As the following examples show, the corrosion inhibitor of the present invention satisfies these requirements. Therefore, a rust and a corrosion of steel materials, which have been the serious problems in preparing concrete or mortar incorporating using sea sands as the fine aggragate, can be effectively prevented.

Furthermore, the discoloration of concrete structures caused by iron powder and the like present in concrete or mortar and the rust of iron scraps used as a aggregate are prevented by the method of the present invention.

BEST MODE FOR CARRYING OUT THE INVENTION

The present invention is illustrated in detail by the following examples. All parts and percents are based on weight.

Example 1

Estimation of Corrosion-inhibiting Effect By Measuring Spontaneous Electrode Potential (1) Preparation of Test Solution A chlorides-containing alkali extraction of concrete was prepared by the following manner.

Normal Portland cement was admixed with distilled water and filtered. The filtrate (pH 12.7) was mixed with an artificial seawater solution (NaCl 12.45%, $MgCl_2-6H_2O$ 1.11%, $Na_2SO_4$ 0.41%, $CaCl_2$ 0.12%, and KCl 0.07%) to give a test solution having a chlorides a concentration of 0.42% or 1.27% calculated in terms of sodium chloride.

Said chloride concentration is the concentration wherein all the chlorides are assumed to have dissolved in the kneading water when fine aggregate containing 0.1% or 0.3% of chlorides calculated in terms of sodium chloride are used to prepare the building concrete comprising 300 Kg of cement, 180 Kg of water and 760 Kg of fine aggregate per cubic meter of the mixture.

The test solutions so prepared were used by adding the definite amounts of corrosion inhibitor thereinto in the following measurements.

(2) A Test Reinforcing Bar

A test reinforcing bar was prepared by eliminating the black skin of a steel bar SR-24 for use in reinforced concrete, grinding the surface of said steel bar by means of No. 400 emery paper, washing the ground surface with benzene and acetone, and drying said steel bar; the bar's ends are hemispheres.

(3) Measurements of Spontaneous Electrode Potential

The test reinforcing bar and a saturated calomel electrode (SCE), used as a reference electrode, were immersed in various 500 ml test solutions contained in 500 ml beakers. The bar and electrode tips were inserted to a depth of 5 cm and were fixed at a distance of 2 cm one another. The liquid surfaces of the test solutions were sealed with a fluid paraffin.

The variations of a spontaneous electrode potential of cells as formed in the above system with the passage of time were measured by means of a high internal resistance potentiometer for 7 days. The measured results are shown in Table 1.

In Table 1, the mark "O" indicates that the spontaneous electrode potential of the test solution is more than about $-300$ mV (the reference standard is SCE) during the measurement and changes toward a noble direction with the passage of time, and the mark "X" indicates that the spontaneous electrode potential of the test solution is less than about $-300$ mV (the reference standard is SCE) during the measurement and changes toward a base direction with the passage of time. The reinforcing bar immersed in the test solution judged as "O" did not rust and the reinforcing bar immersed in the test solution judged as "X" rusted.

TABLE 1

| Chlorides in sand (%) | Corrosion inhibitor (ppm)[1] | | | Judgement |
|---|---|---|---|---|
| | Sodium nitrite | Glycine (Na salt) | Hydrazine hydrate | |
| — | — | — | — | O |
| 0.1 | — | — | — | X |
| 0.1 | 1000 | — | — | X |
| 0.1 | 3000 | — | — | O |
| 0.3 | — | — | — | X |
| 0.3 | 2000 | — | — | X |
| 0.3 | 5000 | — | — | O |
| 0.3 | — | — | 500 | X |
| 0.1 | 500 | 50 | 100 | O |
| 0.3 | 1000 | 75 | 150 | O |

[1]The amount of corrosion inhibitor added to kneading water

As is obvious from Table 1, a satisfactory corrosion-inhibiting effect was obtained by using the present corrosion-inhibiting method when sodium nitrite was present in an amount less than one fifth the amount needed when sodium nitrite alone was used following the prior publicly known method.

Example 2

A Promotion Test

A mortar was prepared according to JIS (Japanese Industrial Standard) R5201 (normal Portland cement-:Toyoura standard sand=1:2, and water-cement ratio 0.65). The chloride concentration in the mortar was adjusted to the concentration obtained when a sand whose chloride content is 0.3% is employed by using the artificial seawater prepared in Example 1. An admixture, Pozzolith 5L (lignin sulphonate containing water-reducing agent commercially available from Nisso Master Bilders Ltd.) was added.

The mortar was used to mold a test body (10 cm×30 cm) whose covering thickness over the bar surface was about 2 cm by immersing two reinforcing bars (1.2 cm×25 cm) treated as in Example 1 into said mortar. After 24 hours, the test body was taken out from its mold and stored in a thermostatic humidity chamber in which the temperature was 70±2° C. and the humidity (RH) was more than 90%. After three months, the reinforcing bars were removed from the concrete and examined for the existence of rust by means of a magnifying glass of 5 magnifications. The results obtained are shown in Table 2.

TABLE 2

| Chlorides in sand (%) | Corrosion inhibitor (ppm)[1] | | | Admixture (%)[2] Pozzolith 5L | Area of rusted surfaces (%) |
|---|---|---|---|---|---|
| | Sodium nitrite | Glycine (Na salt) | Hydrazine hydrate | | |
| — | — | — | — | 0.25 | — |
| 0.3 | — | — | — | — | ca. 40 |
| 0.3 | 2000 | — | — | 0.25 | ca. 10 |
| 0.3 | 5000 | — | — | 0.25 | ca. 2 |
| 0.3 | — | 1000 | — | — | ca. 20 |
| 0.3 | — | — | 500 | — | ca. 15 |
| 0.3 | 1000 | 75 | 150 | — | — |
| 0.3 | 500 | 50 | 100 | — | ca. 1 |
| 0.3 | 500 | 50 | 100 | 0.25 | — |

[1]The amount of corrosion inhibitor added to the kneading water
[2]The ratio of admixture to cement As is obvious from Table 2, it is recognized that a corrosion of the steel is satisfactorily prevented by the present invention. Such a satisfactory effect would not be expected if a prior publicly known corrosion inhibitor alone was used. Furthermore, the tests prove that corrosion-inhibiting ability is increased by using the corrosion inhibitor of the present invention together with a water-reducing agent.

Example 3

Outdoor Exposure Test

Bar-containing molded test bodies were prepared in a similar manner to those of Example 2 except that Vinzol (rosinate containing water-reducing agent commercially available from Yamamune Kagaku Ltd.) was used as an admixture. After preparation, the test bodies were exposed to an outdoor environment for one year, following which the reinforcing bars were removed from the test bodies and examined for the existence of rust as in Example 2. The test results are shown in Table 3.

TABLE 3

| Chlorides in sand (%) | Corrosion inhibitor (ppm)[1] | | | Admixture (%)[2] Vinzol | Area of rusted surfaces (%) |
|---|---|---|---|---|---|
| | Sodium nitrite | Glycine (Na salt) | Hydrazine hydrate | | |
| — | — | — | — | — | — |
| 0.1 | — | — | — | 0.025 | ca. 15 |
| 0.1 | 1000 | — | — | 0.025 | ca. 7 |
| 0.1 | 5000 | — | — | 0.025 | — |
| 0.1 | — | 500 | — | 0.025 | ca. 10 |
| 0.3 | — | — | 500 | 0.025 | ca. 7 |
| 0.1 | 500 | 50 | 100 | 0.025 | — |
| 0.3 | 1000 | 75 | 150 | — | — |
| 0.3 | 700 | 50 | 100 | — | ca. 1 |
| 0.3 | 700 | 50 | 100 | 0.025 | — |

[1]The amount of corrosion inhibitor added to the kneading water
[2]The ratio of admixture to cement From Table 3, one can see that the corrosion inhibitor of the invention also had an excellent effect in this test. The test proves that corrosion-inhibiting ability is increased by using the present corrosion inhibitor together with a water-reducing agent different from the one of Example 2.

Example 4

This test shows that the corrosion inhibitor of the present invention not only has an excellent corrosion-inhibiting effect but also does not have a bad effect on the properties of concrete (coagulation time, bleeding amount, compressive strength, and resistance to freezing and thawing). Particularly, a bleeding amount was decreased in ca. 40% by adding the present corrosion inhibitor together with a commercially available admixture Pozzolith No. 5L or No. 8.

The materials for preparing the concretes to be tested are as follows:
Cement: Normal Portland cement
Aggregates:
  Fine aggregates; Sea sands having a maximum size of 5 mm
  Rough aggregates; Macadam having a maximum size of 20 mm
Corrosion inhibitor of the present invention (sodium nitrite:sodium salt of glycine:hydrazine hydrate=20:2:1)
Commercial admixtures as shown in Table 4 (an admixture is always added to commercial concrete preparations nowaday.

The concretes were prepared by kneading the aforesaid materials under the condition wherein a design strength was 210 Kg/cm$^2$, a slump was 18 cm, and an amount of air was 4%.

Table 4 shows water-cement ratio, percent of fine aggregate, the % amount of an admixture relative to the cement, and the amount of corrosion inhibitor.

TABLE 4

| Sample | Water-cement ratio (%) | Percent of fine aggregates (%) | Admixture[1] [% to cement] | Corrosion inhibitor (g/m$^3$) |
|---|---|---|---|---|
| 1 | 64 | 48 | Vinzol [0.025] | — |
| 2 | 64 | 48 | Pozzolith No. 5L [0.25] | — |
| 3 | 64 | 48 | Pozzolith No. 8 [0.25] | — |
| 4 | 64 | 48 | Pozzolith No. 10L [0.5] | — |
| 5 | 64 | 48 | Vinzol [0.025] | 1380 |
| 6 | 64 | 48 | Pozzolith No. 5L [0.25] | 1380 |
| 7 | 64 | 48 | Pozzolith No. 8 [0.25] | 1380 |
| 8 | 64 | 48 | Pozzolith No. 10L [0.5] | 1380 |

[1]An amount of air was adjusted by AE agent Pozzolith No. 303 when Pozzolith No. 5L, No. 8 or No. 10L was added.

The slump, amount of air and weight per unit volume of the uncoagulated concrete of Table 4 did not change when the corrosion inhibitor of the present invention was added. The properties of the concrete of Table 4 are shown in Table 5.

TABLE 5

| Concrete sample No. | Coagulation time[1] (hour-minute) | | Amount of bleeding (cm$^3$/cm$^2$)[2] | Compressive strength (Kg/cm$^2$)[3] | | Resistance to freezing and thawing[4] (index of durability) |
|---|---|---|---|---|---|---|
| | Start | End | | 7 days old material | 28 days old material | |
| 1 | 6-25 | 8-20 | 0.276 | 172 | 259 | 92.8 |
| 2 | 7-00 | 9-25 | 0.535 | 170 | 251 | 100.6 |
| 3 | 7-30 | 9-40 | 0.441 | 169 | 250 | — |
| 4 | 6-15 | 7-45 | 0.245 | 185 | 266 | — |
| 5 | 6-20 | 8-15 | 0.281 | 176 | 260 | 96.9 |
| 6 | 7-40 | 9-55 | 0.303 | 173 | 253 | 96.8 |
| 7 | 7-45 | 10-10 | 0.261 | 170 | 250 | — |
| 8 | 6-20 | 8-10 | 0.233 | 186 | 262 | — |

[1]Coagulation time was measured according to ASTM C403, wherein the temperature of the mortar after sifting was 24.0° C. and the room temperature during the test was 20 ± 1° C.
[2]The amount of bleeding was measured according to JIS A 1123, wherein the concrete was kneaded at 24.0° C. and then immediately put into a thermostatic chamber (20 ± 1° C.) and where the test was carried out.
[3]Compressive strength was measured according to JIS A 1108.
[4]Resistance to freezing and thawing was measured according to ASTM C 666, wherein a rapid freezing process in air and thawing process in water were employed.

Furthermore, a rate of change of the hardened bodies' length obtained from sample 1, 2, 5 or 6 was measured of 91 days. The corrosion inhibitor of the present invention did not substantially influence on said rate of change.

Industrial Applicability

An mentioned above, the corrosion inhibitor according to the present invention is exceedingly effective as a corrosion inhibitor for steel materials in concrete or mortar, and particularly it displays a notable corrosion-inhibiting effect when applied to reinforced concrete structures in which chloride-containing sea sands are used as aggregates. Although the present invention was mainly developed for preventing a corrosion of steel materials in concrete or mortar, it is also applicable to the corrosion inhibition of iron in other fields. For example, the corrosion inhibitor of the present invention may be used as a corrosion inhibitor for a cooling water containing chlorides in a relatively high concentration in a coastal industrial region.

We claim:

1. A corrosion-inhibiting method for steel materials in concrete or mortar containing a chloride, characterized in that
(1) a nitrite,
(2) a compound of general formula:

$$NH(R)CH\ COOH \qquad (1)$$

(wherein R represents a H atom or an alkyl group having 1 to 4 carbon atoms) or salts thereof, and
(3) a hydrazine hydrate
are incorporated in the chloride containing concrete or mortar.

2. The method according to claim 1 in which 0.5–0.05 part by weight of the nitrite (calculated in terms of sodium nitrite), 0.5–0.005 part by weight of the compound of general formula or salts thereof (calculated in terms of glycine), and 0.5–0.002 part by weight of the hydrazine hydrate (calculated in terms of 100% hydrazine hydrate) are used.

3. The method according to claim 1 in which the nitrite, the compound of general formula [1] or salts thereof and the hydrazine hydrate are incorporated at the time the concrete or mortar is kneaded.

4. The method according to any one of claims 1 to 3 in which the steel material in the concrete or mortar is a reinforcing bar.

5. The method according to any one of claims 1 to 3 in which the steel material is one of the aggregates used to make the concrete or mortar.

6. The method according to any one of claims 1 to 3 in which the nitrite is a sodium nitrite.

7. The method according to any one of claims 1 to 3 in which the compound of general formula [1] is a glycine.

8. A method for inhibiting corrosion of steel associated with a cement based structure prepared from a mixture comprising cement and an aggregate which contains a corrosive chloride compound, said method comprising mixing with the said mixture a corrosion resisting composition comprising (1) an alkali metal or alkaline earth metal nitrite, (2) a compound of the formula $NH(R)CH\ COOH$ or an alkali metal or alkaline earth metal salt thereof, wherein R is hydrogen or an alkyl group having 1 to 4 carbon atoms, and (3) a hydrazine hydrate, and converting the resulting mixture into a solid cement based structure.

9. The method of claim 8 wherein the compound (1) is an alkali metal salt, the compound (2) of the formula is glycine or an alkali metal salt thereof.

10. The method for inhibiting corrosion of steel of claim 8 wherein an aqueous solution containing the said composition of claim 8 is mixed with the said mixture before solidification thereof.

11. A corrosion-inhibiting method for steel materials in contact with concrete or mortar containing a chloride, characterized in that an aqueous solution containing
(1) a nitrite,
(2) a compound of general formula:

$$NH(R)CH_2COOH \qquad (1)$$

or salts thereof, wherein R represents an H atom or an alkyl group having 1 to 4 carbon atoms, and
(3) a hydrazine hydrate
is applied on the steel materials before they are immersed in the chloride containing concrete or mortar.

12. The method according to claim 11 in which the steel material in the concrete or mortar is a reinforcing bar.

13. The method according to claim 11 in which the steel material is one of the components used to make the concrete or mortar.

14. The method according to claim 11 in which the nitrite is a sodium nitrite.

15. The method according to claim 11 in which the compound of general formula (1) is a glycine.

16. The method according to any one of claims 11–15 in which the chloride is present as sea sand aggregate used to make the concrete or mortar.

17. A method for inhibiting corrosion of steel associated with a cement based structure prepared from a mixture comprising cement and an aggregate which contains a corrosive chloride compound, said method comprising coating the steel with an aqueous solution containing (1) an alkali metal or alkaline earth metal nitrite, (2) a compound of the formula $NH(R)CH_2COOH$ or an alkali metal or alkaline earth metal salt thereof, wherein R is hydrogen or an alkyl group having 1 to 4 carbon atoms, and (3) a hydrazine hydrate.

18. The method of claim 17 wherein component (1) is an alkali metal salt, component (2) of the formula is glycine or an alkali metal salt thereof.

* * * * *

UNITED STATES PATENT AND TRADEMARK OFFICE
CERTIFICATE OF CORRECTION

PATENT NO. : 4,365,999

DATED : December 28, 1982

INVENTOR(S) : Toshio FUJITA, et al

It is certified that error appears in the above-identified patent and that said Letters Patent are hereby corrected as shown below:

Column 1, line 17, "protect disasters," should read
-- protect from disasters --.

Column 2, line 53, "a workability," should read
-- the workability, --.

Column 2, line 54, "a scale of constructions" should read
-- the scale of construction --.

Column 3, line 4, "are prevented" should read
-- is prevented --.

Column 4, Table 1, lines 10 and 13 under Judgement
insert -- 0 --.

Column 5, line 64, "nowaday" should read
-- nowadays) --.

Column 6, line 52, "of 91" should read -- for 91 --.

UNITED STATES PATENT AND TRADEMARK OFFICE
CERTIFICATE OF CORRECTION

PATENT NO. : 4,365,999
DATED : December 28, 1982
INVENTOR(S) : Toshio FUJITA, et al It is certified that error appears in the above-identified patent and that said Letters Patent are hereby corrected as shown below:

Column 7, lines 10 and 11, "NH(R) CH COOH" should read -- $NH(R)CH_2COOH$ --.

Column 7, line 21, "formula" should read -- formula (1) --.

Column 7, line 49, "NH(R)CH COOH" should read -- $NH(R)CH_2COOH$ --.

Signed and Sealed this

Fifth Day of February 1985

[SEAL]

Attest:

DONALD J. QUIGG

Attesting Officer    Acting Commissioner of Patents and Trademarks